March 17, 1970      R. BÉGUIN      3,500,630

MAGNETIC TRANSMISSION SYSTEM

Filed July 25, 1967      5 Sheets-Sheet 1

March 17, 1970  R. BÉGUIN  3,500,630
MAGNETIC TRANSMISSION SYSTEM
Filed July 25, 1967  5 Sheets-Sheet 4

United States Patent Office 3,500,630
Patented Mar. 17, 1970

3,500,630
MAGNETIC TRANSMISSION SYSTEM
René Béguin, "La Chaumiere," Chemin des Vignettes, Villette, Geneva, Switzerland
Filed July 25, 1967, Ser. No. 655,803
Claims priority, application Switzerland, July 27, 1966, 10,869/66
Int. Cl. H02k *49/00;* G04c *13/00*
U.S. Cl. 58—23                    10 Claims

ABSTRACT OF THE DISCLOSURE

A magnetic system for the transmission of the movement from a driving rotatable member to a driven rotatable member in which the periphery of each member is provided with a magnetizable zone comprising at least one ferromagnetic merlon and at least one nonmagnetic crenel. The members face one another so as to mutually skim past one another at least at one point of their magnetizable zones without being in mechanical contact with one another, there being a magnetic flux passing from the magnetizable zone of one member to the magnetizable zone of the other member which produces a force of attraction between the merlons of the driving member and the merlons of the driven member which is capable of angularly driving the driven member when the driving member is displaced angularly.

---

The invention relates to a magnetic system for transmitting movement from a driving rotatable member to a driven rotatable member.

Magnetic transmission systems of this type are known, which are intended to ensure a "connection" between a driving member and a driven member. In these systems, which have been particularly developed for transmitting the movement between two members, one of which is situated inside a fluid-tight chamber (for example a vacuum chamber) and the other outside, the magnetic force is used to make these two members fast with one another: these systems are thus in fact magnetic "couplings" and they do not permit of transmission ratios other than a ratio equal to one being obtained. These systems of the siad type offer various advantages:

The members can be made fast with one another at any instant without necessitating a previous or even partial synchronisation of the driving and driven members and without there being any wear due to friction;

When the transmitted torque exceeds a certain limit, defined by the maximum torque which is exerted by the magnetic force, the members "slip" relatively to one another, in such a way that the systems serves the purpose of a "cutout" which disengages if there is an overload and avoids any breaking.

However, the fact of not permitting transmission ratios different from one to be obtained, that is to say, of only permitting a transmission of the "clutch" type to be obtained, to the exclusion of a "meshing" type mission, represents a serious disadvantage.

Furthermore, magnetic systems of the "meshing" type are known in which the driving and driven members are provided with teeth meshing with one another; these teeth are magnetised by a source or sources disposed in such a way that the magnetic fluxes emanating therefrom are opposite. The result thereof is that the flanks of that of the teeth of one of the members which is engaged between the flanks of the teeth of the other member exert on these latter repelling forces which prevent these flanks from coming into mechanical contact with one another. The magnetisation for this reason serves the purpose of a magnetic "lubricant," but does does eliminate the disadvantages connected with the meshing (absence of "cutout" effect). Such systems are more particularly described in French Patents Nos. 994,645 and 1,276,734, this latter mentioning several applications to clockwork mechanisms.

The system which forms the subject of the present invention ensures a movement transmission which does not have the disadvantages inherent in the "clutch" systems or in the "meshing" systems referred to above. This system is characterised in that the periphery of each of these members is provided with a magnetisable zone comprising at least one ferromagnetic merlon and at least one nonmagnetic crenel, by the fact that these members are placed opposite one another in such a way as mutually to skim past one another at least at one point of their magnetisable zone without being in mechanical contact with one another, and in that means are provided for establishing, at least at this skimming point, a magnetic flux running from the magnetisable zone of one of the members to the magnetisable zone of the other member, this flux producing between at least one of the merlons of the driving member and at least one of the merlons of the driven member, a force of attraction capable of angularly driving the driven member when the driving member is displaced angularly.

The invention also has for its object the use of this system in a timepiece for mutually driving at least a pair of movable elements, one being a driving element and the other a driven element.

Arrangements of a similar type are known in connection with clockwork mechanism, in which use is made of the magnetisation of ferromagnetic elements for permitting moving members to act one upon the other. Such arrangements have particularly been proposed for ensuring the alternate movement of the pallet under the effect of the balance wheel and for permitting the pallet to control the advance of the escapement wheel. However, these arrangements themselves no longer ensure a true transmission of the movement of the meshing type from a driving member to a driven member.

Always in connection with clockwork mechanisms, other magnetic systems are also known, particularly the one which is intended to convert the oscillatory movement of a diapason serving as regulating member into the rotation of a movable member. However, this system makes use of two magnetic circuits which are mounted in opposition and of which the equilibrium is periodically disturbed by the diapason. Thus, it is not a question in this case of a system for driving a movable member by another in the sense which has been defined above.

The method by which the invention as set out above is carried into effect is characterised by the fact that the said magnetic transmission system is substituted for the mechanical meshing of these movable elements by making the driving member of this magnetic system fast with the driving element and by making the driven member of this magnetic system fast with the driven element, that a first ferromagnetic armature is positioned facing the driving member and a second ferromagnetic armature is positioned facing the driven member, and that a permanent magnet is positioned between these two armatures and in contact with them, these armatures and this magnet being disposed in such a way as to establish the said magnetic flux passing from the magnetisable zone of one of these members to the magnetisable zone of the other member.

The accompanying drawing illustrates by way of example four embodiments of the system which forms the subject of the invention. The first two embodiments are accompanied by several modifications; the last two are more particularly intended for timepieces.

Figures 1, 1A:
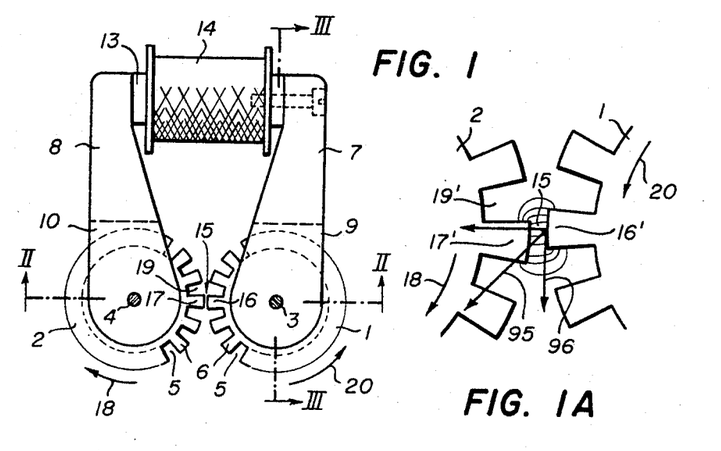
FIGURE 1 represents the first embodiment, seen in plan view.
FIGURE 1A illustrates the functioning of the system shown in FIGURES 1 to 3, FIGURES 4 to 6 illustrate various modifications of a part of the system.
Figure 2:
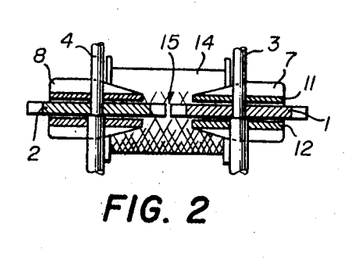
FIGURES 2 and 3 are transverse sections along the lines II—II and III—III, respectively, of FIGURE 1.
Figure 3:
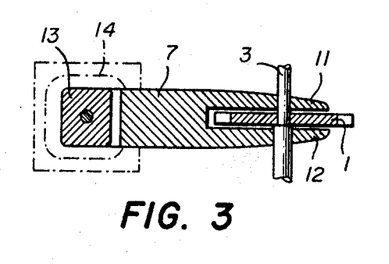

In the constructional forms shown in FIGURES 1, 2 and 3, the movable members are two wheel 1 and 2, respectively, which are of identical diameters and which are coplanar, so that their respective shafts 3 and 4 are parallel. These wheels, which skim past one another without touching at the skimming point 15, are made of a ferromagnetic material, for example, soft iron, and the periphery of said wheels is cut to form crenels 5 separated by merlons 6. They are incorporated into a magnetic circuit, of which the arms 7 and 8, respectively, end in forks 9 and 10, respectively, which each embrace one of the wheels. Thus, the fork 9 comprises two elements 11 and 12 (FIGURE 2), which enclose the wheel 1 on either side of its plane, the shaft 3 of the said wheel turning in bearings formed in these elements. The central part 13 of the magnetic circuit forms a core on which is wound a coil 14 of electrically conducting wire. This coil is adapted to be connected to an electric current source (not shown). The assembly thus forms an electromagnet, of which the air gap is formed by the space 15 separating the wheels 1 and 2.

The system which has just been described operates in the following manner. When the coil is connected to the electricity source, the electromagnet is energised and a magnetic flux is set up in the air gap 15. This flux produces a force of attraction between the merlons 16 and 17 which are opposite one another and this force is radial with respect to the wheels 1 and 2. Let it be assumed that the driving member is the wheel 2 and let it be assumed that this wheel turns in the direction of the arrow 18. If the driven wheel 1 remained immovable, there would be a progressive increase in the air gap until the moment when the crenel 19 would have occupied the position of the merlon 17. However, during this movement, the magnetic field in the air gap is distorted, as shown in FIGURE 1A, and the attractive force between the merlons 16' and 17', which force is represented by the arrow 95, becomes oblique: a tangential component 96 is produced and this component causes the driven wheel 1 to turn in the direction of the arrow 20. Consequently, there is transmission of the movement from the driving member 2 to the driven member 1, this being on account of the force developed in the air gap 15. It is seen that without the driving and driven members being in direct mutual contact, the driving action is obtained by the fact that these members are each provided with a crenellated magnetisable zone as regards its magnetic properties, due to the fact that these members are disposed in such a way that they skim past one another at one point of these magnetisable zones and that means are provided for magnetising the magnetisable zones at least at their skimming point. It can be said that the two members "mesh magnetically" by means of their crenellated magnetisable zones.

It is seen that this magnetic transmission system has several advantages:

It permits of transmission ratios different from one to be obtained, as would be the case with a gearing train; it is sufficient to select the diameters of the driving and driven members 1 and 2 in the desired manner;

It enables the driving of the driven members to be engaged or disengaged at will, as would be the case with a clutch; it is sufficient to magnetise or demagnetise the magnetic circuit 7, 8, 13;

It avoids the troubles which occur in gearing transmissions because of the presence of foreign bodies which have become jammed in the hollows separating the teeth of the driving or driven members;

It is not necessary to provide the driving and driven members with toothings which have a special profile permitting the meshing thereof (cycloidal section, evolute section, etc.).

The example which has just been described is not the only one and it is possible to conceive numerous variants for such a magnetic transmission system, particularly as regards the nature of the magnetisable zones, the nature of the magnetic circuit, the form of the magnetisable zone, the position of this latter within the movable member, the relative arrangement of the movable members, etc.

Thus, in the arrangement which is shown in FIGURES 1, 2 and 3, the magnetistable zone is formed by the entire movable member, which is made of a ferromagnetic material and has its circumference cut into a succession of crenel alternating with merlons. Thus, in this case, it is the actual contour of the movable member which gives the magnetistable zone its crenellated structure. However, the movable member can have the form of a disc of nonmagnetic material, on which are distributed pellets of ferromagnetic material disposed on the periphery of each of its faces. In this case, it is not the contour of the movable member which gives the required crenellated structure to the magnetisable zone, but the distribution of the ferromagnetic pellets and the nonmagnetic spaces which separate them.

The magnetisation source which, in FIGURE 1, is an electromagnet, may very well be a permanent magnet, more especially a ferrite element which takes the place of the core 13 and its coil 14, or a permanent magnet made fast with one of the movable members, for example a "ferroxdur" disc with transverse or radial magnetisation.

Figure 4:
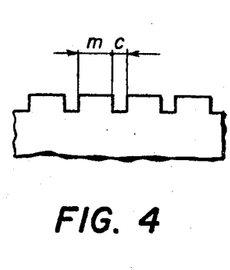
Figure 5:
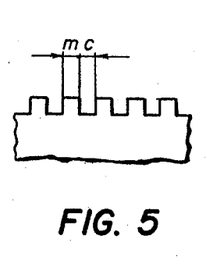
Figure 6:
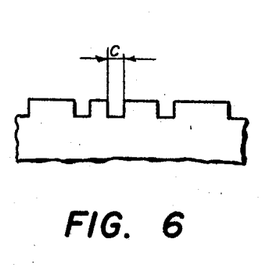

As regards the form of the magnetisable zone, various modifications are possible as regards the dimensions of the merlons and crenels:

The merlons have a constant width and the crenels also have a constant width, but these widths are different for the merlons and the crenels that is to say $$(\text{Constant}=m)\neq(c=\text{Constant})$$

as will be seen in FIGURE 4;

The merlons and the crenels have constant and identical widths, $m=c=$Constant, as shown in FIGURE 5;

The crenels have the same width $c=$Constant, as will be seen in FIGURE 6, this being regardless of the width of the merlons which separate them, which width can even vary from one merlon to another.

In addition, one of these forms can be given to the magnetisable zone of one of the movable members and another of these forms can be given to the magnetisable zone of the other member: actually, there is no obligation from the outset for the magnetisable zone to have the same form in each of the members which have to cooperate. For example, the "pitch" of the magnetisable zone of the driving member (the "pitch" being the length $m+c$) can quite well be greater than that of the magnetisable zone of the driven member. However, it is advantageous in this case for the crenels to have a width $c$ which is the same in each of the two magnetisable zones.

In the embodiments as previously described, the moveable members were coplanar and the magnetic flux in the air gap at the point where the magnetisable zones skim past one another was radial. However, it is possible to have other arrangements. For example, the movable members can be coaxial, in which case the magnetic flux in the air gap is axial.

Figure 7:
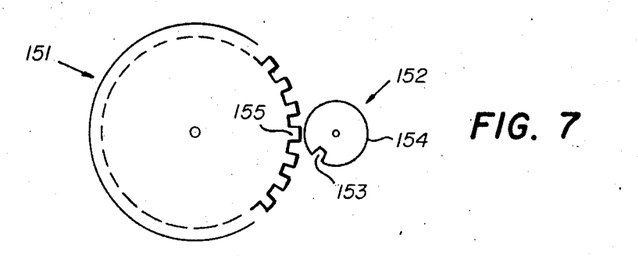
FIGURES 7 to 10 show diagrammatically four particular embodiments which provide an intermittent driving of one of the members by the other, the first embodiment (FIGURE 7) forming a counter.
Figure 8:
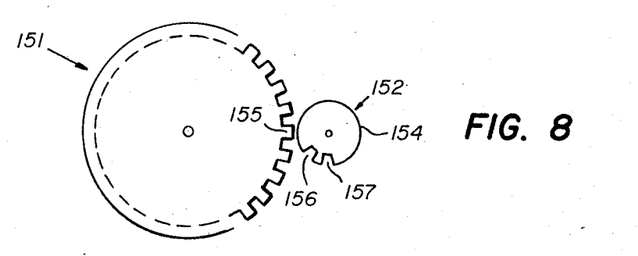
Figure 9:
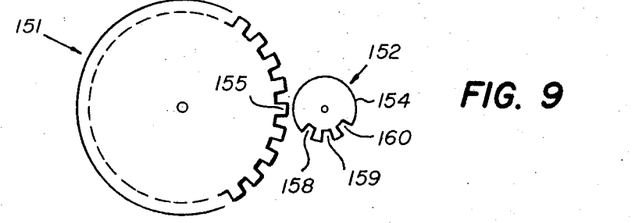
Figure 10:
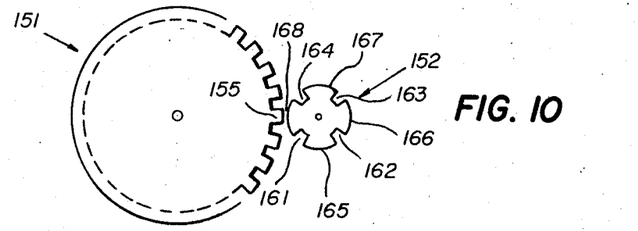

Particularly advantageous arrangements which concern the shape of the magnetisable zone of the driving member are shown diagrammatically in FIGURES 7 to 10. In FIGURE 7, the driven member 151 has a magnetisable zone which comprises a succession of merlons and crenels which all have the same width, while the driving member 152 has a magnetisable zone which only has a single crenel 153, the width of which is equal to that of the crenels and merlons of the magnetisable zone of the driven member, and only a single merlon 154 of great width, referred to as the large merlon, which occupies all the remainder of the periphery. It is seen that, under these conditions, the driven member experiences an intermittent driving and effects an advance by one step with each revolution of the driving member. The result is that this arrangement permits a counter to be produced, in which the angle through which the driven member 151 has turned during a given period is proportional to the number of revolutions executed by the driving member 152 during this period. In addition, between each of its advances, the driven member 151 remains stationary, and it is blocked magnetically because of the attraction which is exerted during the "non-driving" part of the rotation of the driving member by the large merlon 154 on the merlon 155 of the driven member. If the magnetisable zone of the driving member 152 counts two consecutive crenels 156 and 157 (FIGURE 8), the driven member 151 will advance by two steps with each revolution of the driving member. The advance of the driven member will be three steps per revolution of the driving member if the magnetisable zone of this latter counts three consecutive crenels 158, 159 and 160 (FIGURE 9) and this advance will be followed by a pause. Generally speaking, the advance is $n$ successive steps per revolution of the driving member if this latter counts $n$ consecutive crenels. In addition, during the intervals separating these advances, the driven member is locked mechanically because of the attraction which is exerted by the large merlon 154 on the merlon 155. If the consecutive notches are distributed regularly along the entire magnetisable zone of the driving member 152 and are separated by large merlons, there will also be a discontinuous driving of the driven member 151, but the advance of this latter will be equivalent to one step each time that the driving member will have carried out a fraction of a revolution equal to the angle separating two of its consecutive crenels. Thus, in the case as illustrated in FIGURE 10, in which the driving member 152 counts four crenels 161, 162, 163 and 164 at 90° to one another and separated from one another by four large merlons 165, 166, 167 and 168, the driven member 151 advances by one step at each quarter revolution of the driving member. The driven member is moreover magnetically blocked in its position while its magnetisable zone is facing a merlon, such as the merlon 168, of the driving member, so that the system illustrated diagrammatically in FIGURE 10 takes the place of a mechanism of the "Maltese cross" type. As a free choice exists as regards the number of crenels in the driving member, the magnetic transmission system as described makes it possible to obtain, from a continuous rotation of the driving member, a discontinuous, jerky driving of the driven member, with intermediate blocking of this latter, and it is possible to obtain any kind of law of advancement.

As regards possible applications of such a magnetic driving system, they exist particularly in those cases where only small torques are to be transmitted, for example in connection with measuring instruments, in the control of processes or in clockmaking.

Figure 11:
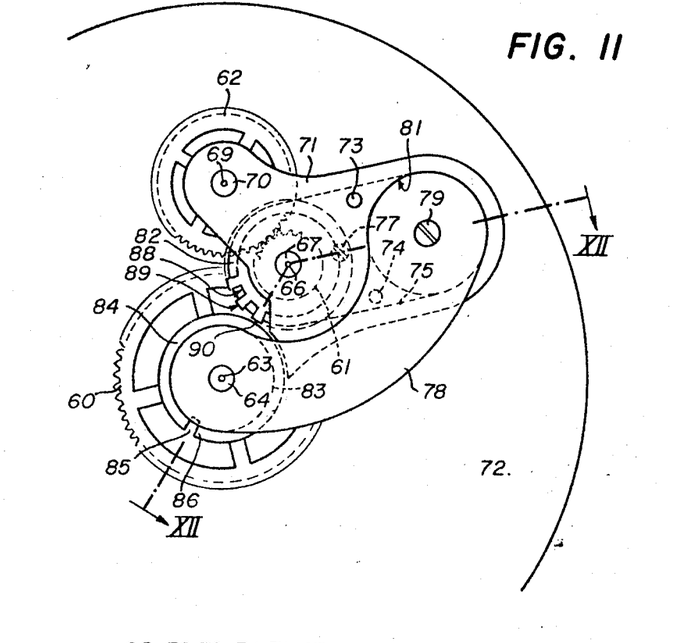
FIGURES 11 and 12 are respectively a plan view and a section of one embodiment which is particularly intended for a timepiece, in the present instance, the counting part of a stopwatch.
Figure 12:
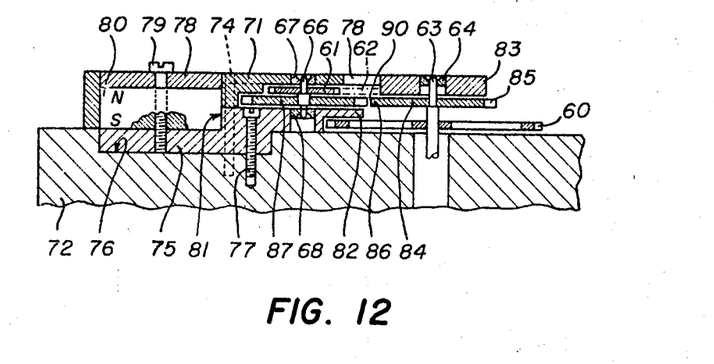

Thus, FIGURES 11 and 12 show one use of the arrangement in a stop watch, where it serves as a counter. The minute wheel can be seen at 60 and the pinion meshing with the counter wheel 62 is shown at 61. The minute wheel 60 is mounted on a shaft 63 pivoted on the jewel 64 and on another jewel which is not shown, the pinion is mounted on a shaft 66 pivoted on the jewels 67 and 68 and the counter wheel is mounted on a shaft 69 pivoted on two jewels, of which only the upper jewel 70 can be seen in FIGURE 11. This upper jewel is mounted in a chrono bridge 71 of nonmagnetic material, which is positioned relatively to the mechanism plates 72 by two pins 73 and 74. A lower armature 75 of ferromagnetic material is mounted in a bearing 78 milled in the plate 72 and carries the lower jewel 68 on which the shaft 66 of the pinion 61 is pivoted. This lower armature is fixed to the mechanism plate 72 by means of the two pins 73, 74. An upper armature 78 of ferromagnetic material carries the upper jewel 64 on which is pivoted the shaft 63 of the minute wheel 60. By means of a screw 79, these two armatures 75 and 78 enclose a cylindrical permanent magnet 80 located in a bearing 81 formed in the bridge 71.

The lower armature 75 and the upper armature 78 thus form a magnetic circuit which is magnetised by the permanent magnet 80, which is polarised axially, as indicated by the letters N and S; the poles of this circuit are formed by the ends 82 and 83 of the lower and upper armatures 75 and 78, respectively.

Arranged on the shaft 63 of the minute wheel 60 is a wheel 84 of ferromagnetic material, which is mounted so as to be as close as possible to the upper pole 83 and which is for this reason situated above the minute wheel. The periphery of this ferromagnetic wheel has a notch forming a single crenel 85, the remainder of this periphery constituting a single large merlon 86.

Arranged on the shaft 66 of the pinion 61 is another wheel 87 of ferromagnetic material, which is mounted so as to be as close as possible to the lower pole 82 and which is for this reason situated below the pinion 61. The periphery of this ferromagnetic wheel 87 is cut to provide a succession of crenels 88 and merlons 89, these having the same width and this width being identical with that of the crenel 85 in the first ferromagnetic wheel 84. These two wheels 84 and 87 are coplanar and they are disposed in such a way as to skim past one another at a point 90. The ferromagnetic wheel 84, fast with the minute wheel 60, and the ferromagnetic wheel 87, fast with the pinion 61, constitute a pair of movable members, the wheel 84 being the driving member and the wheel 87 being the driven member. These members are coupled with one another by the magnetic flux which is set up in the air gap existing at the point 90, because they are magnetised by the magnetic circuit formed by the armatures 75, 78 and the magnet 80.

The operation of this counter is as follows: As the merlon 86 of the driving member 84 moves past the point 90, there is no other effect on the driven member 87 but a radial force, which does not cause it to change its angular position. When the crenel 85 passes in front of the said point, a tangential component is set up and this component drives the merlon of the driven member 87 in the same direction as the crenel 85 of the driving member 84. This component exists until the moment when once again the merlon 86 is disposed in front of the point 90: thus, an advance by one "step" of the driven member 87 is produced, this step being equal to the angle at the centre separating two consecutive crenels of the driven member. The result is that, with each revolution of the driving member 84 and thus with each revolution of the minute wheel 60, there is an advance by one step of the driven member 87 and thus of the pinion 61. The angular displacement of the driven member thus represents the sum of the complete revolutions carried out by the driving member. If the minute wheel makes one revolution per minute, the angular displacement of the pinion 61 and thus of the counter wheel 62 which meshes with it will express the number of minutes elapsed from the moment when the minute wheel is set in motion. As the position which is occupied by the "toothing" of the driven member 87 facing the merlon of the driving member 84 is a stable position corresponding to the maximum flux between these members, that is to say, to the minimum magnetic resistance in the air gap situated at the point 90, the driven member is magnetically locked in the position which it reaches after the passage of the crenel of the driving member. It is thus sufficient to equip the arrangement which has just been described with a zeroising system, for example the mechanism known under the name of "heart," and to complete it by an engaging and disengaging system, respectively, in order to make it into a stopwatch mechanism.

Figure 13:
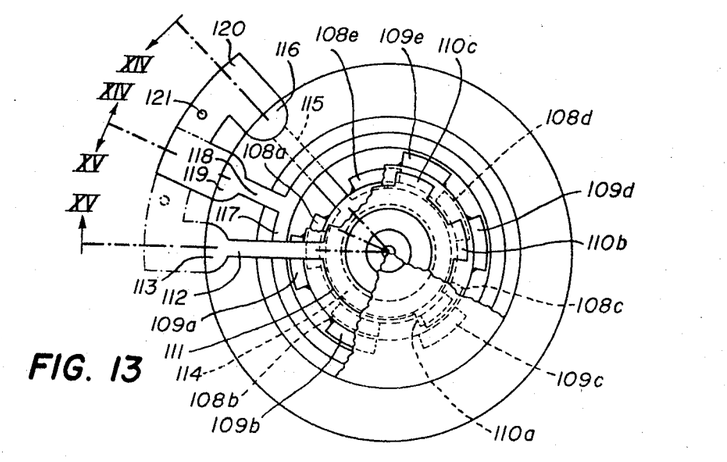
FIGURES 13 to 15 are respectively a plan view, partly broken away, and two sectional views of another embodiment which is also intended for use in a timepiece.
Figure 14:
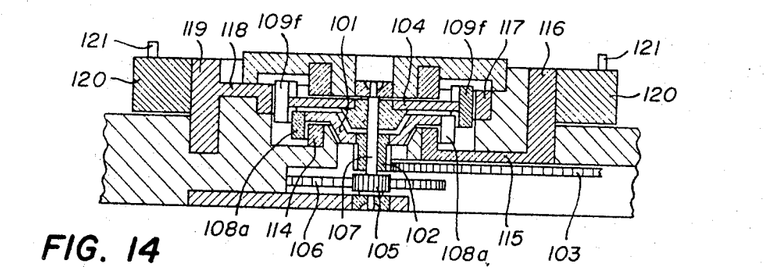
Figure 15:
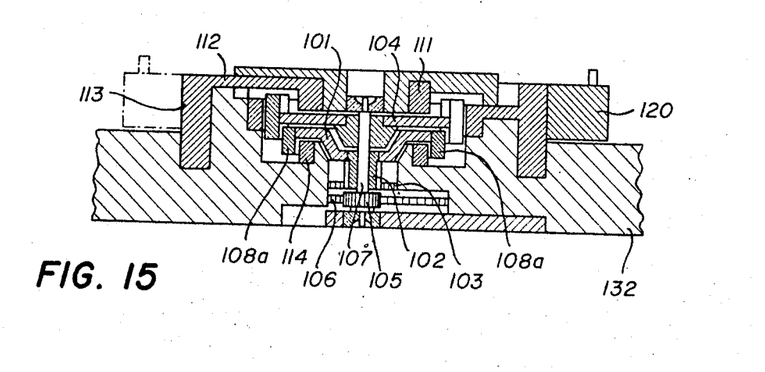

The engaging and disengaging system which, in the known stopwatches, comprises a coupling wheel mounted on a movable bridge can itself also be advantageously replaced by a magnetic system, and this constitutes another application of the invention. It is this system which is shown in FIGURES 13, 14 and 15. It comprises a driving member 101 which is fast with a pinion 102 driven by the driving wheel 103 of the stopwatch, and a driven member 104, fast with a pinion 105, which drives the minute wheel 106 of the stopwatch. The driving and driven members are coaxial; the shaft 107 of this latter extends through the pinion 102 and acts as a pivot therefor. The driving member 101 is made of nonmagnetic material and it carries on its periphery a succession of five ferromagnetic pellets 108a . . . 108e, disposed parallel to the axis, so as to form a magnetisable zone having the form of a bell or a crenellated ring which extends from one side (in the present case the lower side) of the plane of this member. The driven member 104 is made in similar manner, but the six ferromagnetic pellets 109a . . . 109f which it comprises project on either side of its plane so as to form a magnetisable zone having the form of a double bell, that is to say, of a ring extending on either side of the plane of this member; the lower bell is adapted to cooperate with the magnetisable zone of the driving member, while the upper bell is adapted to cooperate with a fixed ferromagnetic element. This latter comprises only three merlons 110a, 110b and 110c, which belong to a ferromagnetic ring 111 forming an element of a fixed external magnetic circuit, referred to as the "locking" circuit, comprising a connecting bar 112 and a contact stud 113. The driving member 101 is disposed facing the pole 114, in ring form, of another fixed external magnetic circuit, known as the "movement circuit," which comprises a connecting bar 115 and a contact stud 116. The locking magnetic circuit and the movement magnetic circuit have in common a part which comprises a pole 117 in ring form, a connecting bar 118 and a stud 119. The ring 117 is disposed outside the driven member 104 and its height is such that the pole which it forms is able to cooperate just as well with the upper bell as with the lower bell which forms the magnetisable zone of this driven member. The elements 114, 115 and 116 form a first driving armature, and the elements 117, 118 and 119 form a second driving armature, while the elements 111, 112 and 113 form a locking armature. A permanent magnet 120, which is the magnetisation source, can be displaced under the effect of a control means acting on a pin 121 from a movement position (which is represented in full lines) to a stop position (which is represented in chain-dotted lines). In the stop position, the magnet 120 energises the magnetic circuit formed by the stud 113, the connecting bar 112, the ring 111 and the merlons 110a . . . 110c, on the one hand, that is to say, the locking armature, the stud 119, the connecting bar 118 and the ring 117, on the other hand, that is to say, the second driving armature: there is then a magnetic flux in the air gap which is contained between the merlons of the fixed magnetisable zone and those of the merlons of the upper bell of the magnetisable zone of the driven member 104 which face one another, and this flux immobilises the driven member 104 and thus the minute wheel 106. In the movement position, the magnet 120 energises the magnetic circuit formed by the stud 116, the connecting bar 115 and the ring 114, on the one hand, that is to say, the first driving armature, the stud 119, the connecting bar 118 and the ring 117, on the other hand, that is to say, the second driving armature: there is then a magnetic flux in the air gap between those of the merlons of the driving member 101 and of the driven member 104 which face one another, and this flux causes the driving of the driven member by the driving member and thus the driving of the minute wheel 106 by the driving wheel 103.

It is seen that with this engagement and disengagement magnetic system of the stopwatch, the strictly mechanical members act only on the magnet 120 and not at all on the moving parts themselves. The result is that the disturbance which the operations of engagement and disengagement of the stopwatch mechanism produce in the running of the driving wheel are reduced with respect to those which are produced by the known systems, which are strictly mechanical.

The magnetic system which has just been described enables another improvement to be obtained, which makes much more precise the instant of starting of the minute wheel. Actually, in the mechanical engaging systems of stopwatches, it is necessary to cause the minute wheel to mesh with an intermediate driving wheel, and for this meshing to be possible, it is necessary for the teeth of one wheel to coincide with the hollows of the other. As this instant of engagement is not known in advance, the instant of meshing can be retarded, relatively to the instant of engagement, by a period which can reach that which corresponds to the advance of one half step of the toothing. With the magnetic system, it is not necessary for the pitch of the crenellations of the driving and driven members to be identical. It is thus possible to select crenellations having different numbers of merlons; it is then the smallest common multiple of the number of merlons of the driving member and of the number of merlons of the driven member which defines the fraction of the step or pitch representing the maximum error in the engagement. Thus, in the embodiment shown in FIGURE 13, the driving member has five merlons (the merlons 108a . . . 108e) and the driven member has six (the merlons 109a . . . 109f), so that the delay in the magnetic "meshing" does not exceed a period equal to 1/30 of the pitch, because it is immaterial which is the pair of merlons 108b and 109b which cooperate (as is the case in FIGURE 13) rather than another pair. It is moreover possible to reduce the tooth pitch by taking a higher number of merlons, each of them then being of smaller width, and to give one of the members one merlon more than the other; the numbers of merlons are then incommensurable numbers and their smallest common multiple is equal to their product and the meshing error is consequently considerably reduced. The same artifice may be used for reducing the disengaging error, that is to say, the delay which is shown by the instant of immobilisation of the driven member with respect to the instant of disengagement; it is sufficient to give the fixed element a number of merlons such that this number and that of the merlons of the driven member have a high smallest common multiple.

Figure 16:
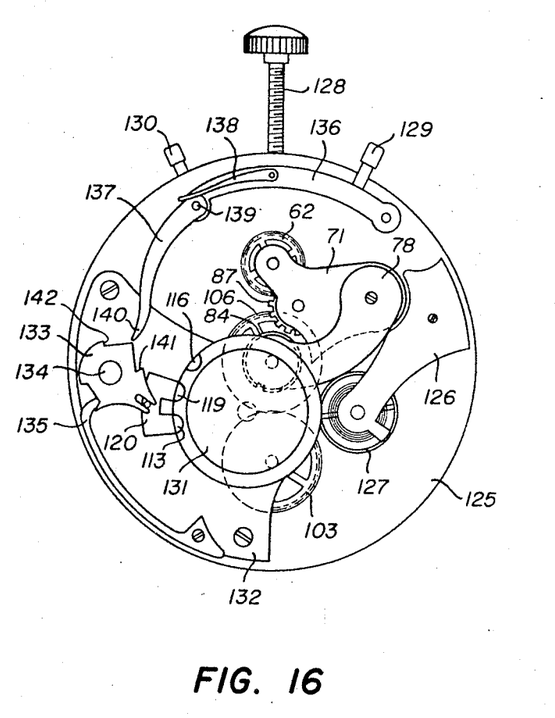
FIGURE 16 is a plan view showing a timepiece provided with these two particular embodiments.

The association in a single timepiece of two specific magnetic driving systems shown in FIGURES 11 and 12, on the one hand, and in FIGURES 13 to 15 on the other hand, leads to a stopwatch which has the general appearance shown in FIGURE 16. The conventional main elements can be seen in this figure: the mechanism plate 125, the cock 126 which carries the spring balance wheel 127, the winder 128, the start-stop button 129 and the zeroising button 130. The engaging-disengaging magnetic system 131, which has been described in detail by reference to FIGURE 13, is carried on a special bridge 132, on which is also mounted a control cam 133, of which the movement about the shaft 134 is limited by a spring stop 135. The effect of this cam is to displace the magnet 120 of the engaging-disengaging magnetic system from its "stop" position (this is the position in which it is shown and in which it is facing the contact studs 113 and 119 of the magnetic circuit) to its "go" position (which is not shown but in which it is facing the contacts 116 and 119). The cam 133 is actuated from the button 129 by means of a lever 136 on which is pivoted a nose 137. This nose is brought into a given position (the position which is shown) by means of a spring 138 acting on a flat, and it can be displaced to either side of this position by pivoting about the pivot 139. The end 140 of the nose 137 cooperates with the shoulders 141 and 142, respectively, depending on whether the cam is in one or other of its positions. This engaging-disengaging magnetic system causes the driving wheel 103 to cooperate with the minute wheel 106. The counter magnetic system, which has been described in detail by reference to FIGURES 11 and 12, can also be seen in FIGURE 16. It is possible to see the stopwatch bridge 71, which carries the driven member 87 and the counter wheel 62, the upper armature 78 of the magnetic circuit, and the driving member 84 fast with the minute wheel 106. The operation of such a stopwatch will be self-understood, because this latter only differs from a conventional stopwatch by the known mechanical systems being replaced by the magnetic systems which have each been separately described above. The only purpose of FIGURE 16 is to show how these magnetic systems are both disposed inside a stopwatch and to show their relative positions.

What I claim is:

1. A timepiece comprising at least one pair of moving parts, one a driving part, the other a driven part, a driving member rigidly connected to the driving part, a driven member rigidly connected to the driven part, a magnetic system for the transmission of the movement from the driving member to the driven member wherein each member has a periphery with a magnetizable zone comprising at least one ferromagnetic merlon and at least one nonmagnetic crenel, said members facing one another such that the members mutually skim past one another at least at one point of their magnetizable zone without being in mechanical contact with one another, and means for establishing, at least at the said skimming point, a magnetic flux passing from the magnetizable zone of one of said members to the magnetizable zone of the other member, said flux producing between at least one of the merlons of the driving member and at least one of the merlons of the driven member a force of attraction which is capable of angularly driving the driven member when the driving member is displaced angularly, said means for establishing said magnetic flux comprising a first ferromagnetic armature positioned to face the driving member, a second ferromagnetic armature positioned to face the driven member, and a permanent magnet inserted between said armatures and in contact with them, said armatures and the said magnet being disposed to establish the said magnetic flux passing from the magnetizable zone of one of these members to the magnetizable zone of the other.

2. A timepiece according to claim 1, wherein said timepiece is a stopwatch provided with a minute wheel and a pinion which meshes with a counter wheel, said driving member being a circular driving member the magnetizable zone of which has a single crenel and a single large merlon, said minute wheel being rigidly connected to the driving member, said single large merlon being formed by that part of the said magnetizable zone which extends from one flank to the other of the single crenel, said driven member being a circular driven member the magnetizable zone of which is formed by a succession of crenels and merlons which all have a width equal to that of the single crenel of said circular driving member, the pinion being rigidly connected to the driven member so that upon each revolution of the minute wheel, the pinion advances by an angular step equal to the angle which separates two consecutive crenels of the driven member, and then is blocked magnetically by the effect of the single large merlon of the driving member, so that the said magnetic system forms the counter mechanism of the said stopwatch.

3. A timepiece according to claim 1, wherein said timepiece is a stopwatch provided with a driving wheel, a minute wheel and a coupling control, said driving wheel being rigidly coupled with the driving member the magnetizable zone of which has the form of a crown extending on either side of the plane of this member and is formed by a continuous succession of crenels and merlons which are all of the same width, said minute wheel being rigidly coupled with the driven member the magnetizable zone of which has the form of a crown extending from one side of the plane of this member and is formed by a continuous succession of crenels and merlons which are all of the same width, said members being arranged coaxially, the driving member being situated on one side of the driven member and inside the crown of the latter, said driving member including a central portion facing the central portion of the driven member, a fixed part of ferromagnetic material, provided with at least one merlon and at least one crenel disposed facing the magnetizable zone of the said driven member and forming a blocking magnetic armature placed on the other side of the driven member inside the crown of the latter, a first driving circular magnetic armature placed inside the magnetizable zone of the driving member and a second driving circular magnetic armature placed outside the magnetizable zone of the driven member, said second driving armature extending on either side of the plane of said driven member, said permanent magnet being capable of occupying two positions, in the first of which it is capable of establishing the said flux between the locking armature and the second driving armature, to cause a magnetic locking of the minute wheel, and in the second of which it is capable of establishing this flux between the first and the second driving armatures, to cause the driving of the minute wheel by the driving wheel, coupling control means having stop and coupling positions said permanent magnet being connected to said coupling control means so that when the latter is in the stop position, the said magnet is in the first position, and that when the said coupling control means is in the coupling position, the said magnet is in the said second position.

4. A timepiece according to claim 1, wherein the magnetizable zone of one of the two driving or driven members, respectively, has a number of merlons which differs from the number of merlons of the magnetizable zone of the other member, so that the angular delay which represents the angle traversed by the driving member between the instant when the flux through the latter is established and the instant when the driven member is driven is reduced to a value equal to the angular pitch of the magnetizable zone of the driving member, divided by the smallest multiple common to the number of merlons of the driving member and to the number of merlons of the driven member.

5. A timepiece according to claim 3, wherein the magnetizable zone of one of the two driving or driven members, respectively, has a number of merlons which differs from the number of merlons of the magnetizable zone of the other member, so that the angular delay which represents the angle traversed by the driving member between the instant when the flux through the latter is established and the instant when the driven member is driven is reduced to a value equal to the angular pitch of the magnetizable zone of the driving member, divided by the smallest multiple common to the number of merlons of the driving member and to the number of merlons of the driven member.

6. A stopwatch comprising a driving wheel, a center wheel, a coupling control for connecting said driving wheel and center wheel, said coupling control having a coupling position and a stopping position, an intermediate wheel, a counter wheel which meshes with said intermediate wheel, a disengageable continuous drive coupled to said driving wheel whereby said center wheel may be continuously driven by said driving wheel with said coupling control in its coupling position and may be disengaged from said driving wheel and locked when said coupling control is in its stopping position, a stepping drive connecting said intermediate wheel to said center wheel to cause said counter wheel to rotate by at least one step upon each complete revolution of said intermediate wheel, at least one of said drives being a magnetic drive which comprises: a pair of circular members, one being a rotary driving member, the other being a rotary driven member, each of which is provided with a peripheral crenellated magnetizable zone comprising at least one ferromagnetic merlon and at least one nonmagnetic crenel; a pair of ferromagnetic armatures, one being adjacent said driving member and the other adjacent said driven member; and a permanent magnet having an operative position between said armatures to produce a magnetic flux passing from the magnetizable zone to one of said members to the magnetizable zone of the other, said driving member and said driven member being so disposed as mutually to skim past one another at at least one point of their respective magnetizable zones.

7. A stopwatch according to claim 6, wherein said driving member is fastened to said center wheel and is provided with a magnetizable zone constituted by one large merlon and one narrow crenel, said driven member being fastened to said intermediate wheel and provided with a magnetizable zone constituted by a succession of merlons separated by crenels having an identical pitch equal to that of the crenel of the driving member, said permanent magnet being permanently positioned between said armatures, whereby said magnetic drive constitutes said stepping drive, the latter being adapted to cause said intermediate wheel to advance by one step, equal to said pitch, each time the crenel of said driving member passes said skimming point, and to be locked during the remainder of the time by the merlon of said driving member.

8. A stopwatch according to claim 6 in which said driving member is adapted to be rotated by said driving wheel and includes a web and is provided with the magnetizable zone in the form of a crown protruding to one side of the web and comprising a succession of merlons separated by crenels, said merlons and crenels being of equal pitch; said driven member being adapted to rotate said center wheel and including a web and provided with said magnetizable zone in the form of a crown protruding to both sides of the web and comprising a succession of merlons separated by crenels, said merlons and crenels being of equal pitch, said driven and driving members being coaxially positioned with said driven member capping said driving member and with the webs of both members lying adjacent one another whereby their magnetizable zones are in skimming relationship over their entire periphery; said one armature being in the form of a stationary annular element mounted inside the driving member so as to be in skimming relationship with its magnetizable zone over its entire periphery; said other armature being made of a ferromagnetic material in the form of a stationary annular element mounted outside the driven member and extending across the plane of the web of the latter so as to be in skimming relation with its magnetizable zone over its entire periphery; a locking armature in the form of a fixed element made of a ferromagnetic material and provided with at lease one merlon and at least one crenel and mounted inside the driven member so that the top of the merlon of said locking armature may skim the magnetizable zone of the driven member; said permanent magnet being linked to said coupling control whereby it may selectively be moved, under the action of the latter, to said operative position and to a further operative position, the first of which is reached when said control is in its stopping position and enables said magnet to produce a magnetic flux passing from said locking armature to said common armature through the magnetizable zone of said driven member whereby said center wheel may be magnetically locked through said driven member, said further operative position being reached when said control is in its coupling position and enables said magnet to produce a magnetic flux passing from said common armature to said driving armature through the magnetizable zones of said driven and driving members, whereby said center wheel may be magnetically driven by said driving wheel through said driven and driving members.

9. A stopwatch according to claim 8, wherein the number of merlons in the magnetizable zone of said driving member is different from that in the magnetizable zone of said driven member thereby to limit the starting lag represented by the angular displacement effected by the driving member from the instant when a flux is made to pass therethrough to the instant when the driven member is actually caused to move to a value equal to a complete revolution divided by the lowest common multiple between the number of merlons of said driving member and the number of merlons of said driven member.

10. A stopwatch according to claim 8, wherein said locking armature comprises a circular succession of merlons separated by crenels, both having an equal pitch, wherein the tops of said merlons are in skimming relation with the magnetizable zone of said driven member over its entire periphery, and wherein the number of merlons of said locking armature is different from that in the magnetizable zone of said driven member thereby to limit the stopping lag represented by the angular displacement effected by said driven member from the instant when a flux is made to pass therethrough to the instant when the driven member is actually caused to stop to a value equal to a complete revolution divided by the lowest common multiple between the number of merlons of said driven member and the number of merlons of said locking armature.

References Cited

UNITED STATES PATENTS

| | | | |
|---|---|---|---|
| 3,400,287 | 9/1968 | Huff | 310—103 |
| 3,343,015 | 9/1967 | Dome | 310—84 |
| 3,309,988 | 3/1967 | Touchman | 310—105 X |
| 3,223,865 | 12/1965 | Gladstone | 310—103 |
| 3,058,294 | 10/1962 | Zemla | 310—103 X |
| 2,900,021 | 8/1959 | Richtmyer et al. | 58—22.9 |
| 2,722,617 | 11/1955 | Cluwen et al. | 310—103 |

MILTON O. HIRSHFIELD, Primary Examiner

M. O. BUDD, Assistant Examiner

U.S. Cl. X.R.

58—22.9; 310—84, 103